A. F. POOLE.
CALCULATING MACHINE.
APPLICATION FILED JULY 12, 1912.
1,273,180.
Patented July 23, 1918.
8 SHEETS—SHEET 1.
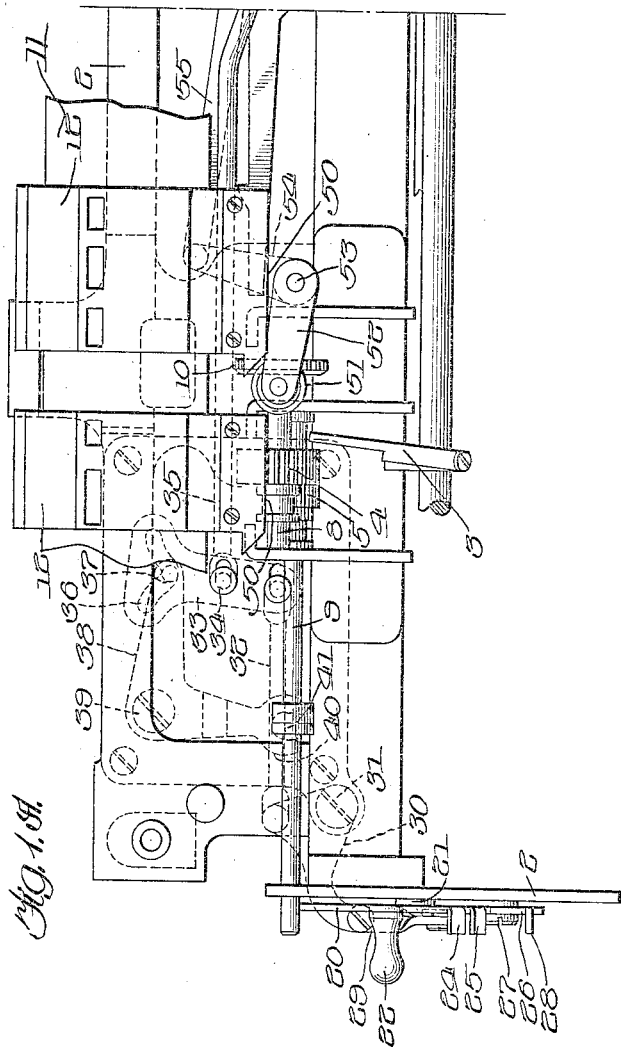

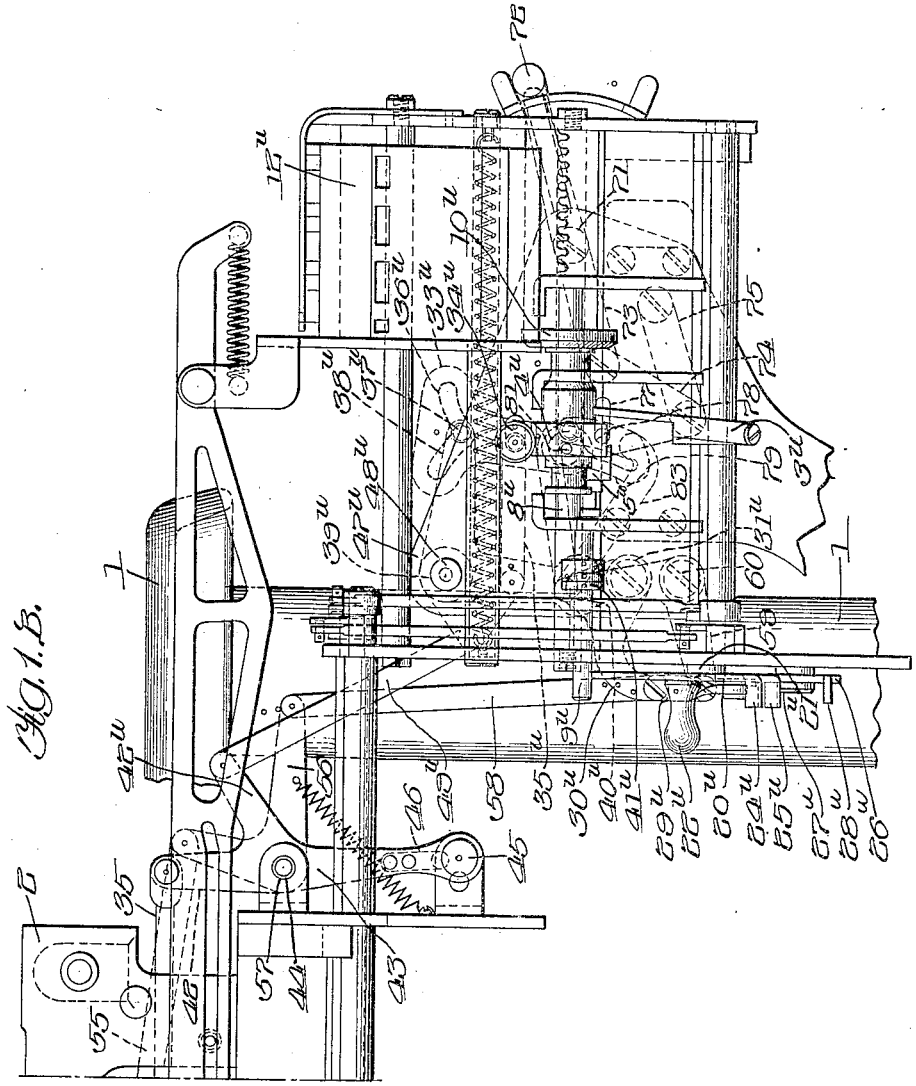

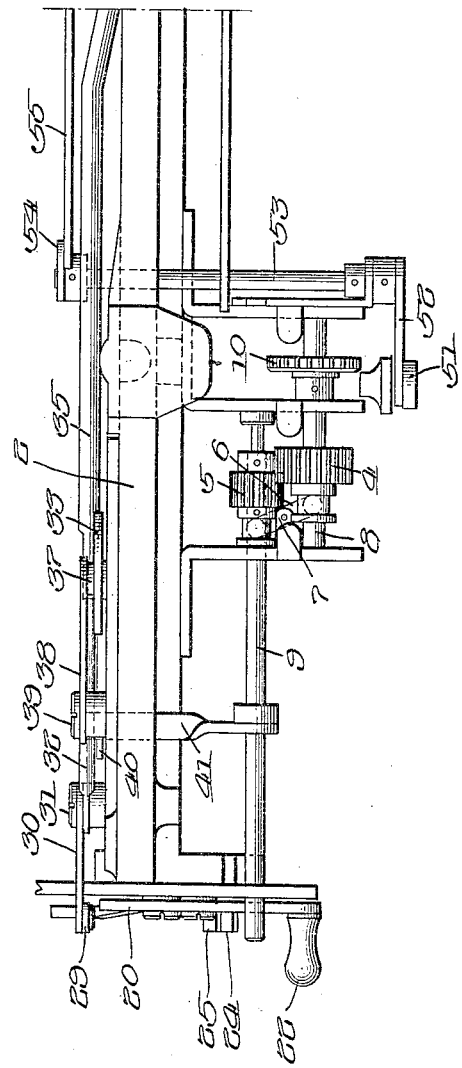

A. F. POOLE.
CALCULATING MACHINE.
APPLICATION FILED JULY 12, 1912.
1,273,180.
Patented July 23, 1918.
8 SHEETS—SHEET 4.
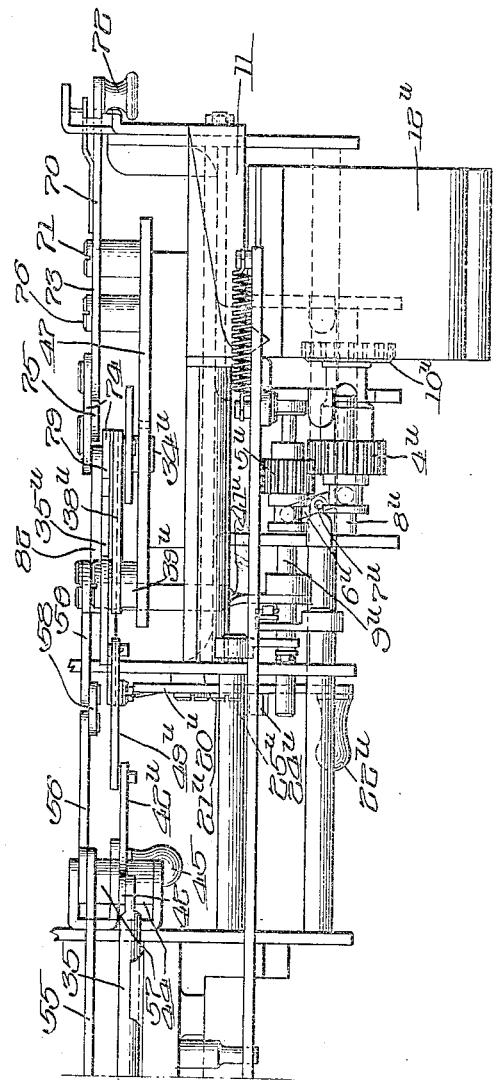

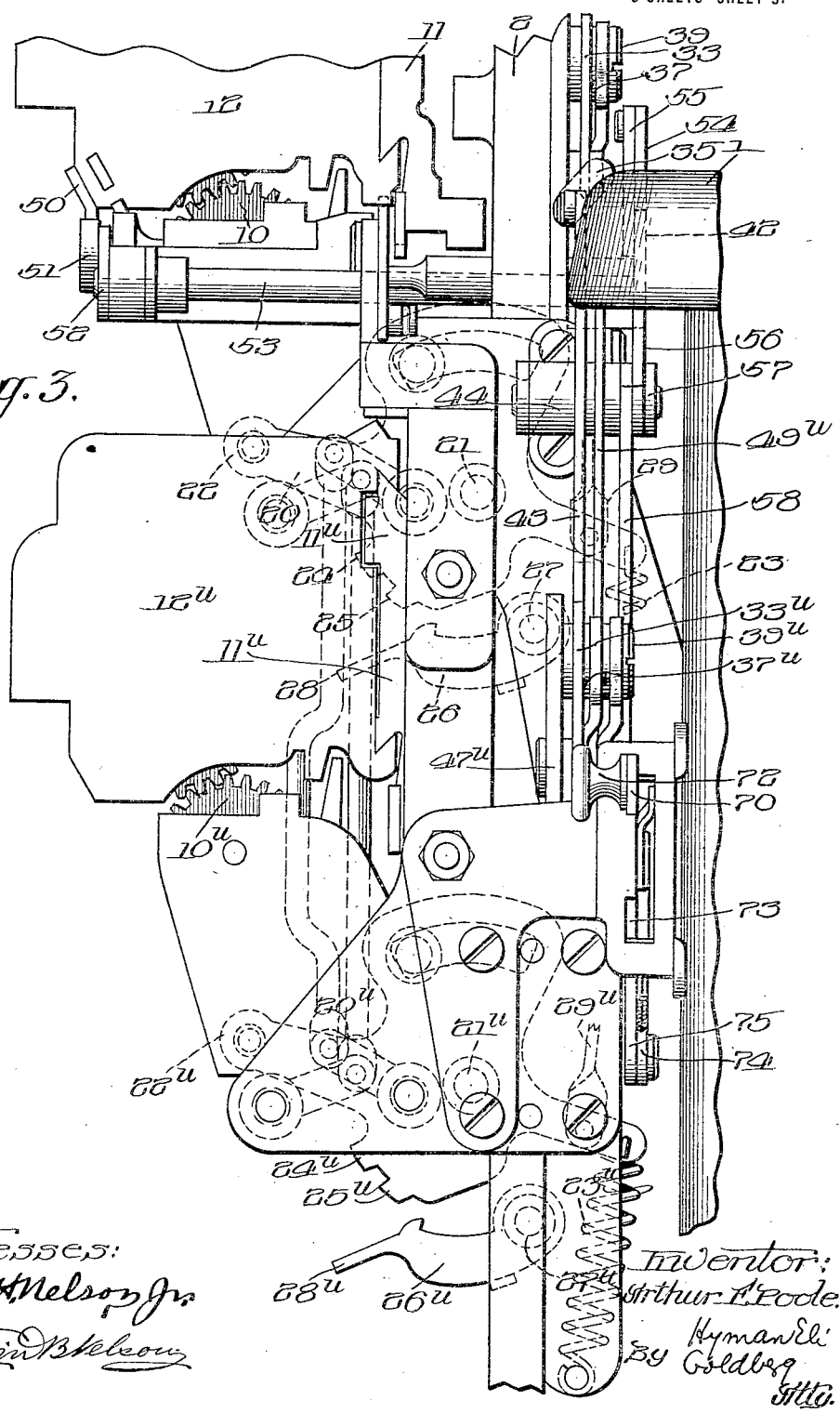

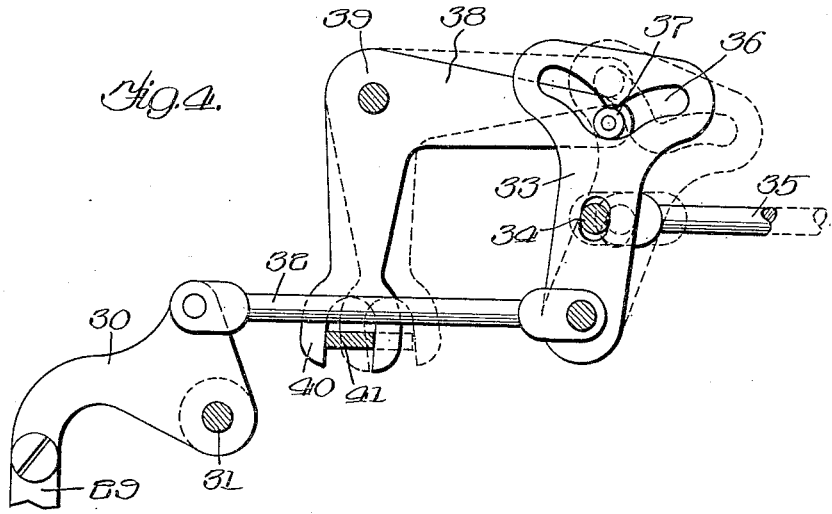
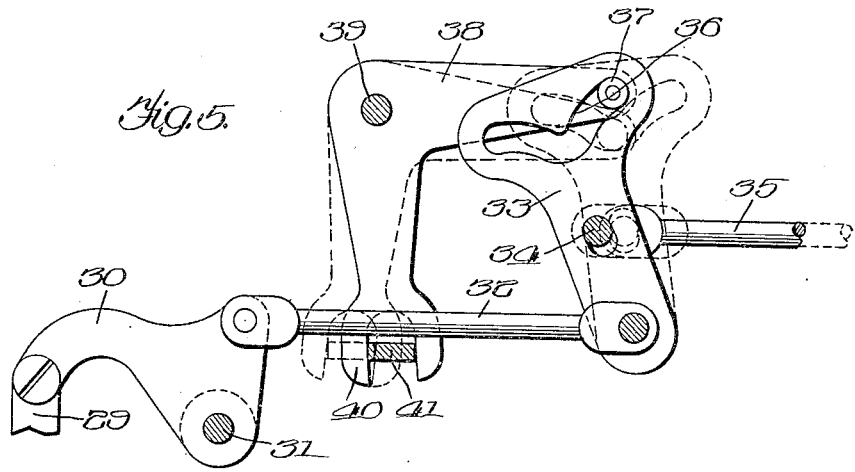

A. F. POOLE.
CALCULATING MACHINE.
APPLICATION FILED JULY 12, 1912.
1,273,180.
Patented July 23, 1918.
8 SHEETS—SHEET 7.
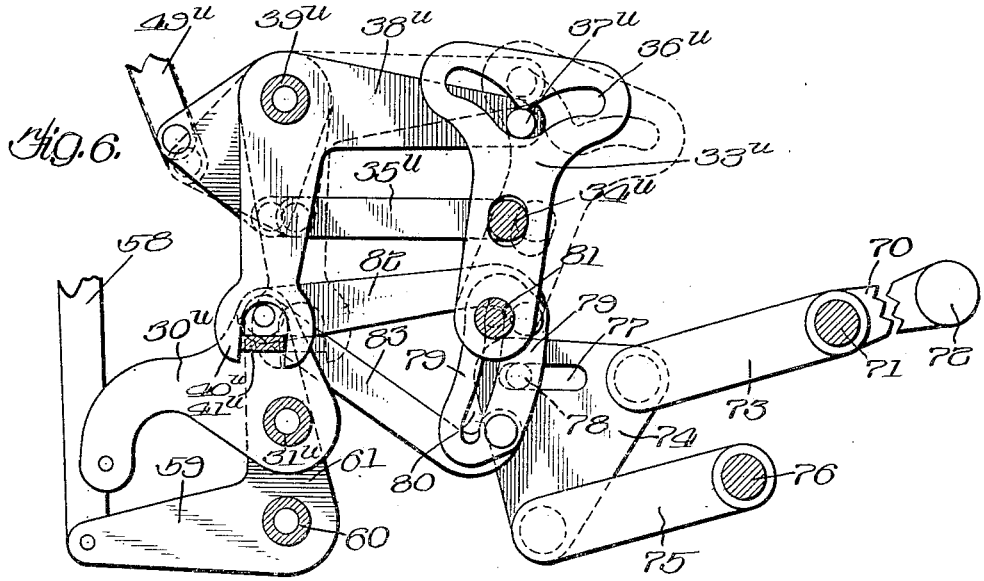
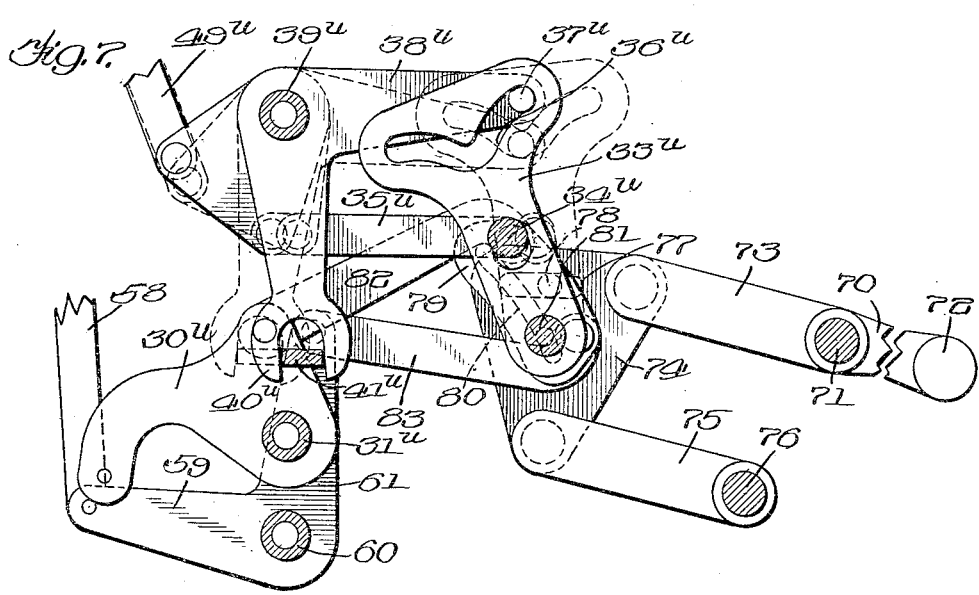

A. F. POOLE.
CALCULATING MACHINE.
APPLICATION FILED JULY 12, 1912.
1,273,180.
Patented July 23, 1918.
8 SHEETS—SHEET 8.
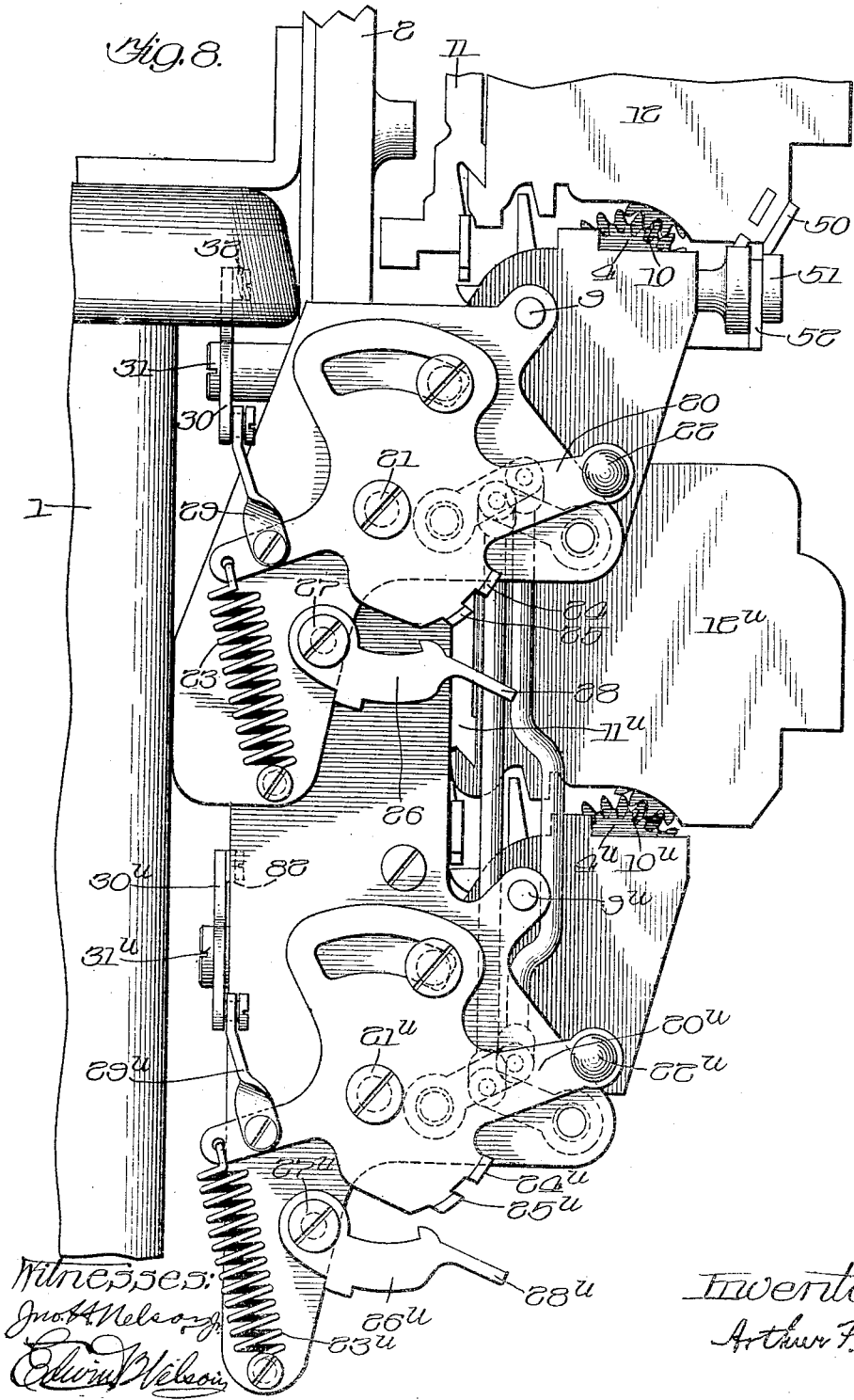

UNITED STATES PATENT OFFICE.

ARTHUR F. POOLE, OF CHICAGO, ILLINOIS, ASSIGNOR, BY MESNE ASSIGNMENTS, TO THE WAHL COMPANY, OF WILMINGTON, DELAWARE, A CORPORATION OF DELAWARE.

CALCULATING-MACHINE.

1,273,180.  Specification of Letters Patent.  Patented July 23, 1918.

Application filed July 12, 1912. Serial No. 709,010.

*To all whom it may concern:*

Be it known that I, ARTHUR F. POOLE, a citizen of the United States, residing at Chicago, in the county of Cook and State of Illinois, have invented certain new and useful Improvements in Calculating-Machines, of which the following is a specification.

My invention is a universal correcting mechanism for calculating machines. There are now on the market machines which work in conjunction with typewriters and are ordinarily called typewriter calculating machines. The great majority of those already on the market are provided with totalizers which are able to calculate totals of numbers printed on the sheet in vertical or columnar arrangement. There are also some calculating attachments that beside the above columnar totalizers have also a universal totalizer. The latter may be used to obtain the total of numbers printed anywhere on the sheet whether in columnar arrangement or in horizontal or linear arrangement or even in disorder. For many forms of account the operator employs only the columnar totalizers, for other forms of account he employs the universal totalizer and for still other forms of account he employs both the universal totalizer and one or more columnar totalizers. In most forms of account the columnar totalizers are used for addition mainly, subtraction occurring so infrequently that the operator manually changes the machine to subtract whenever subtraction in the columnar totalizer is required. But in many forms of account the changings of the condition of the universal totalizer from addition, subtraction or nonoperation to any other one of the three just mentioned conditions, occur so frequently that cam mechanism has been introduced to accomplish such changings. The above are to be found in connection with machines already constructed.

An example of this type of machine will be found in the machine described in the copending application of John C. Wahl, Serial Number 702,053, filed June 6, 1912.

Even the very best of operators sometimes make mistakes. The transposition of numbers, say the writing of 89 instead of 98, is very common. Whenever an error has been introduced by the operator it is advisable to correct same as soon as possible to thus relieve the mind of the operator. It is evident that the error can be eliminated, by reversing the machine and again introducing into it the number constituting the error. Any number that was wrongly inserted additively would thus be now wrongly inserted again subtractively. The two would therefore cancel each other, and similarly for subtractive errors.

As long as the calculating machine contained only one or two handles the operator had no difficulty in so manipulating them as to properly reverse the machine to thus correct an error. That was when only columnar totalizers were used. In complicated forms of account the reversing of the machine to correct an error ordinarily requires several manipulations of several handles. In this the operator is very liable to confusion. Moreover when the changing of the condition of the universal totalizer is by cam mechanism and not by hand the operator ordinarily does not know what handles to move in order to reverse the mechanism to correct an error. It has therefore been found advisable to introduce a correcting device which will under all circumstances operate to reverse the calculating machine. This is the object of my invention.

Repeating, the object of my invention is a correcting mechanism operating in conjunction with the calculating machine, which calculating machine is provided with columnar totalizers and a universal totalizer.

Viewed from another standpoint the object of my invention is a correcting mechanism applicable to calculating machines provided with a universal totalizer which universal totalizer is adapted to be brought into additive, subtractive or nonoperative condition, both manually and automatically.

Another object of my invention is a correcting mechanism applicable to a calculating machine provided with columnar totalizers and a universal totalizer, which universal totalizer is adapted to be brought into an additive, nonoperative or subtractive condition both manually and automatically.

Another object of my invention is the particular construction of the reversing mechanism operating in conjunction with the condition determining handle of the calculating machine.

Another object of my invention is the particular construction of the mechanism determining the condition of the totalizer, whether said totalizer should be cam determined or manually determined and which is the condition that is determined.

Another object of my invention is the construction of the correcting mechanism particularly in connection with one handle which determines whether the universal totalizer should have its condition determined automatically or manually and with another which determines the particular additive, subtractive or nonoperative condition of the universal totalizer when the first handle determines that the universal totalizer shall be manually governed, and also in connection with cam mechanism which determines the particular additive, subtractive or nonoperative condition of the universal totalizer when the first handle determines that said universal totalizer shall be cam governed.

It is of course understood that the mechanism embodying my invention can be widely varied without departing from the principles thereof. My invention is thus applicable to many forms of machines but in the drawings I have illustrated it as applied to the machine now on the market in connection with the Remington typewriter and described in Patent No. 893,719 issued to John C. Wahl, July 21, 1908. Said calculating machine contains a great deal of mechanism which is necessary in order that it shall function properly as a calculating machine but whose particular construction and operation does not need to be known for the proper understanding of my invention. Moreover in said machine there is such a multiplicity of parts that the introduction of them in the drawings would tend to confuse rather than to clarify the construction of my invention. I have therefore left them out.

It will therefore be understood that there is supposed to be present a Remington typewriter with all its necessary parts, and by preference provided also with a tabulator. Such typewriter is shown in the drawings only by a piece of its framework. Mounted upon said typewriter is the framework of the calculating machine by which some of the parts of the calculating machine are supported. Other parts of the calculating machine are connected to and travel with the carriage of the typewriter. Keeping the above preliminary remarks in mind, particularly the fact that mechanism essential to the operation of the calculating machine but not essential to the understanding of this invention has been omitted, reference will now be made to the drawings.

Of these Figures 1<sup>A</sup> and 1<sup>B</sup> together form a front elevation of the mechanism of my invention and parts coöperating therewith.

Figs. 2<sup>A</sup> and 2<sup>B</sup> together similarly form a plan of said mechanism.

Fig. 3 is an elevation while looking at the right side of the machine.

Fig. 4 shows that part of the correcting mechanism which is particularly associated with the columnar totalizers.

Fig. 5 shows the same mechanism as Fig. 4, but with the parts in a different operative position.

Fig. 6 shows the correcting mechanism when the universal totalizer is manually governed.

Fig. 7 shows the same mechanism when said totalizer is cam governed.

Fig. 8 is an elevation looking at the left side of the machine.

The framing of the typewriter is numbered 1 (Figs. 1<sup>A</sup> and 1<sup>B</sup>). The framing of the calculating machine is numbered 2. The typewriter is provided with keys operating the type bars and causing the carriage to advance. Among such typewriter keys are the numeral keys. These are suitably connected to the calculating machine. The depressing of any of said numeral keys sets into operation a train of mechanism with which said calculating machine is provided and as a result of which, movement is imparted to a piece 3, the sector, to an amount dependent upon the numerical value of the numeral key depressed. The movement of the sector is transmitted to either the direct gear 4 or the reverse gear 5 (Fig. 1<sup>B</sup>). Both of these gears are always in mesh with each other and each of them is provided with a groove wherein is inserted an end of a lever 6, fulcrumed on the framework at 7. The direct gear 4 is slidably but nonrotatably mounted upon its supporting shaft 8. The reverse gear 5 is rotatably but not slidably mounted upon its shaft 9. When axially moved the construction just described compels the two gears to be moved in opposite directions. The location of the sector is such that it meshes with only the right end of the particular one of said two gears which occupies the position most to the right. Normally the direct gear is in the zone of action of the sector and the reverse gear is not. This is the position illustrated in the drawings. The placing of the direct gear out of the zone of action of the sector will advance the reverse gear nearer to said zone of action but not yet within it. Any movement imparted to the sector at this moment will therefore be transmitted to neither of said gears. Both of them will be inactive. The placing of the shaft 9 still farther to the right will draw the direct gear still farther away and will intrude the reverse gear into the zone of action of the sector. The chain of mechanism just described will therefore cause the direct gear to rotate in one direction when the shaft 9 is in its left or normal position, cause it not to rotate when the shaft is in its middle position, and cause it to rotate in the opposite direction when the shaft is in its right position. The movement of the direct gear is transmitted to the master gear 10 rigidly fastened to the shaft 8. The master gear is the one which operates the various carrying wheels of the totalizer as the latter pass over it *seriatim*, and thus by depressing the numeral keys of the typewriter there is caused the introduction into the totalizer of the number represented by said numeral key. The above mechanism is old and is to be found in the machine now on the market. It is also described in the above cited patent.

As the keys of the typewriter are operated the carriage advances step by step. Connected thereto is the totalizer bar 11 which serves to support and carry along therewith various columnar totalizers 12. Said totalizers during the operation of the machine are therefore carried over the master gear to receive the various numbers to be columnarily totaled.

In one of its forms the calculating machine is provided with a universal totalizer $12^u$ (Figs. $1^B$ and $2^B$). The latter is mounted somewhat to the right and lower in order not to interfere with the travel of the totalizer bar 11 and columnar totalizers 12. The universal totalizer $12^u$ is mounted upon a short universal totalizer bar $11^u$ which is supported upon the framing in a manner to be slidable thereon within a limited zone of travel. There is mechanism provided for the universal totalizer whereby it may be temporarily connected to such columnar totalizer as is then passing over and coöperating with the master gear 10. After said columnar totalizer has been carried beyond the master gear then the universal totalizer returns to its preceding position and becomes connected to the next columnar totalizer. Moreover the columnar totalizer for many calculations need not contain therein a carrying wheel but might be a dummy totalizer whose only function is to properly move the universal totalizer. The exact mechanism of the interconnection between the universal totalizer and the columnar totalizers is not a part of my invention and will therefore not be described. Mechanism disclosing such a connection is described in Patent No. 893,717 issued July 21, 1908, and others.

The carrying wheels of the universal totalizer are adapted to be moved by the universal totalizer master gear $10^u$. The latter is of the same construction as the columnar master gear 10. It is also provided with a columnar direct gear $4^u$, reverse gear $5^u$, lever $6^u$, fulcrum $7^u$, shaft $8^u$, shaft $9^u$ and sector $3^u$. All these parts coöperating with the universal totalizer are similar in size and shape to the similar parts coöperating with the columnar totalizers and are operated from the numeral keys of the typewriter in the same manner by means of parallelogram link connections similar to those shown and described in my copending application Serial Number 709,011, filed July 12, 1912. As a result the universal master gear $10^u$ may therefore be made additive, nonoperative or subtractive by placing the shaft $9^u$ in its left, middle or right position respectively. The above also is old and not part of my invention which will now be entered upon.

Mounted upon the framing 2 of the calculating machine at its left side, is a lever 20, (Fig. $1^A$ and Fig. 8) fulcrumed at 21, and provided with a handle 22, whereby it may be depressed and a spring 23, tending to return the lever to its normal position, with the handle 22 elevated. The lever is provided with a hook 24 and another hook 25. These hooks coöperate with a pawl shaped lever 26 fulcrumed on the framing at 27 and provided with a finger piece 28. Whenever the operator depresses the handle 22 and releases same then the lever returns to its normal position. But should the operator desire to lock it in a displaced position or in a still further displaced position then he lifts the pawl lever 26 by means of its finger piece and allows it to hook there with the hook 24 or the hook 25.

The back of the lever 20 is connected to the lower end of a link 29 rising vertically therefrom (Figs. 4 and 5). The upper end of the link is connected to the end of an arm extending from the lever 30 and fulcrumed on the framing at 31. Said lever 30 is also connected by another arm to the left end of a link 32 extending to the right. Said link by its other end is connected to the lower end of a reverser plate 33. The reverser plate in its turn is pivotally mounted upon a stud 34 upon the end of a link 35. The stud is guided in the framing but is freely movable horizontally. In its upper portion the reverser plate 33 is furnished with a cam slot 36 which embraces a pin 37 forming part of a lever 38 fulcrumed in the framing at 39 and provided with an arm which extends from said fulcrum downward and which with a fork end 40 embraces a finger 41 extending to the back from the shaft 9.

The normal position of the parts is clearly shown at the left portion of Fig. 1 and also by the full lines of Fig. 4. Temporarily the pivot 34 is fixed. By the chain of mechanism described the locating of the handle 22 in any of its three positions therefore locates the reverser plate 33 also in three corresponding positions. The depressing of the handle causes the movement of the cam slot 36 to the left. The shape of the latter is evidently such as to cause the shaft 9 to move to the right. Finally therefore the location of the handle 22 in its highest position causes the master gear 10 to be additive, the location of the handle in its middle position causes the master gear to be nonoperative; and the location of the handle in its lowest position causes the master gear to be subtractive.

The link 35 extends a distance and has its other end fastened to the end of an arm 42 forming part of a correcting lever 43 fulcrumed in the framing at 44 and provided with a finger piece 45 (Figs. 1$^A$, 1$^B$, and 2$^A$ 2$^B$). Said finger piece is also provided with mechanism whereby it may be locked in any of its operative positions. The correcting lever 43 is also furnished with a spring 46 which tends to return it to its normal position. An examination of the chain of mechanism just described (see Fig. 1) shows that the moving of the correcting finger piece 45 to the left causes the pivot 34 of the reverser plate to be moved to the right. Moreover this movement remains practically the same in amount no matter what the position of the lower portion of said reverser plate. The upper portion, namely the cam slot 36, of said reverser plate is therefore given a movement which in this particular case is always approximately twice the movement of the pivot 34. This results in always reversing the condition of the master gear 10. This is so because if the pin previously occupied its positive normal position, that is the exact middle of the cam slot, it would now occupy its correcting position at the extreme left and top of the slot, which is a subtractive position. If the pin occupied its normal nonactive position at the middle of the right half of the cam slot it will now occupy the middle of the left half of the cam slot, which is again a nonactive position. And finally if the pin occupied the normal subtractive position at the extreme right of the cam slot it will now occupy the exact center thereof, which is an additive position. Under any and all circumstances the movement of the correcting lever therefore causes the columnar master gear 10 to be reversed in condition, assuming that the reverse of a nonactive condition is still a nonactive condition.

In connection with the universal master mechanism there is provided for shaft 9$^u$ of the latter a finger 41$^u$, fork end 40$^u$, lever 38$^u$ fulcrumed at 39$^u$, pin 37$^u$, cam slot 36$^u$, link 35$^u$ pivotally mounted at 34$^u$, and reverser plate 33$^u$ (Figs. 6 and 7). But in this case, purely for convenience of construction and not for any theoretical reason, the link 35$^u$ has its other end connected to the plate 47$^u$ fulcrumed in the framing at 48$^u$ and connected by means of a link 49$^u$ to another arm 42$^u$ of the correcting lever 43. The moving of the correcting finger piece 45 to its correcting position therefore causes the pivot 34$^u$ to move in the same direction as the pivot 34. Moreover said movement is equal in amount.

In connection with the universal totalizer there are mounted upon the framework also a lever 20$^u$ fulcrumed at 21$^u$ and provided with a handle 22$^u$, spring 23$^u$, hooks 24$^u$ and 25$^u$, pawl lever 26$^u$ fulcrumed at 27$^u$ and provided with finger piece 28$^u$. There are also present link 29$^u$, lever 30$^u$ fulcrumed at 31$^u$. All these parts are similar in size and shape and are similarly mounted to their corresponding parts in the columnar portion. The further mechanism connecting the lever 30$^u$ to the reverser plate 33$^u$ in the universal totalizer is different than the mechanism in the columnar portion and this difference is introduced in order to allow said mechanism to accommodate itself to the conditioning of the universal mechanism by the cams as well as manually. Said mechanism will now be described.

As previously mentioned the cams determining the additive, nonactive or subtractive condition of the universal totalizer are mounted on the columnar totalizers 12 (Fig. 1$^A$). They occupy the lower front portion of said totalizers and are numbered 50. Said cams are of three levels having their surfaces either high, middle or low. Coöperating with the surfaces of said cams is a roller 51 mounted upon the end of an arm 52 rigidly fastened to a shaft 53 extending to the back, and rotatably mounted in the framework, and provided at its back end with an arm 54 rising vertically. The latter arm at its upper end is connected to the left end of a link 55 which with its right end is connected to the upper end of an arm of a lever 56 fulcrumed in the framing at 57 and provided with another arm extending from its fulcrum to the right and having its end connected to the upper end of a link 58 whose lower end is connected to the end of an arm of a lever 59 fulcrumed in the framing at 60 and provided with an arm 61 rising from its fulcrum vertically. As a result of the chain of mechanism just described the locating of roller 51 by the cams 50 with said roller in its high position will cause the arm 61 to occupy a left position, the locating of the roller in its middle position will cause said arm to occupy a middle position and the low position of the roller corresponds to the right position of the arm. In the further explanation of the operation of the parts reference will be had to the position of the arm 61.

Mounted upon the framing at the right portion of the machine is a lever 70 fulcrumed at 71 and provided with a finger piece 72 (Figs. 1ᴮ, 2ᴮ, and Figs. 6 and 7). Normally the finger piece occupies an elevated position near an inscription on the framing Man (short for manual). The finger piece can be depressed to be brought near another inscription Cam. Snapping mechanism is provided to retain the lever in either of said positions. The lever is provided with a right portion 73 pivotally connected to a raisable plate 74. The latter is also pivotally connected to a link 75 fulcrumed on the framing at 76. The four pieces, namely the framing, the right portion 73, the raisable plate 74 and the link 75 are so dimensioned that they make a parallelogram. The moving of the finger piece 72 from its one position to the other therefore causes the raisable plate 74 to be moved up or down but it retains its angular position constant. The raisable plate 74 is provided with a horizontal slot 77 which embraces a pin 78 forming part of a link piece 79. Said link piece is provided with a slot 80 embracing a pin 81 fastened in the lowest part of the reverser plate 33ᵘ. The link piece has also fastened thereto one end of a link 82 whose other end is fastened to an arm 61 and an end of another link 83 whose other end is fastened to a lever 30ᵘ.

In the position of the parts shown in Fig. 6 the finger piece 72 is elevated. The indicator shows that the universal totalizer is supposed to be under manual control, that is it is supposed to be calculatingly conditioned by the location of the handle 22ᵘ or rather by the location of the lever 30ᵘ. It is easily seen to be so since with the plate 74 in its lowered position the pin 81 is close to the pivot of the link piece 79 and the link 82. The latter is connected to the lever 30ᵘ. Any displacement of said lever 30ᵘ is therefore immediately transmitted to the pin 81. The presence of the link 83 produces a slight but thoroughly negligible effect upon the movement of said pin 81. The presence of said link 83 may therefore be left out of account. The mechanism in this location of the parts therefore becomes equal to the mechanism described in connection with the columnar master gear, which has been thoroughly explained.

In Fig. 7 the finger piece 72 is shown in its lower position. The plate 74 is now in its elevated position. The link piece 79 is also in its elevated position and as a result thereof it is now the link 83 connecting said link piece to the lever 61 which is effective in producing motion in the pin 81 and not the other link 82. Attention is here called to the fact that the above links 82 and 83 occupy their left position normally, that is additively, their middle position when they are inactive, and their right position when they are subtractive. The locating of the handle 72 in its lowered position therefore brings the universal mechanism completely under the control of the lever 61, that is of the roller 51, that is of the cams 50 mounted on the columnar totalizer bar. Moreover the correcting mechanism functions properly when the universal totalizer is so cam conditioned. Again attention is called to the fact that the mechanism brings the universal totalizer from any of its three possible manually determined conditions to any of its three possible cam determined conditions without any interference. The manual conditions are determined by the location of the handle 22ᵘ only and are not affected by the cams 50. The cam determined conditions are determined completely by the cams 50 and are not affected by the handle 22ᵘ. Moreover the correcting handle serves to reverse and to correct the columnar portion independently of the universal portion and vice versa. The solution is therefore complete and embraces all possible combinations.

Attention is called to the fact that in all the above mechanism there is not a spring or other yielding member. It is all positive. The reverser plate 33 is an aggregate movement plate whose position depends upon the position of the two factors each of which is able to move independently of the other. It is therefore not necessary to disconnect one in order to make the other one of the two factors operative. It is evident that in theory this is exactly like any other aggregate movement mechanism, such as an epicyclic mechanism which could readily be substituted therefor.

I am acquainted with the co-pending application of John C. Wahl, for improvement in calculating machines, Serial Number 629,308, filed May 23, 1911 and do not wish to claim herein any of the structure disclosed in his application.

In some of the claims I have used the term "aggregate motion mechanism." By this I mean a mechanism in which a link or wheel is adapted to receive motion from two independent sources, the mechanism being so designed that the motion of said part or wheel will be proportional to the algebraic sum (or aggregate) of the motions of the sources. In the present application the part 33, Fig. 4, is adapted to receive motion from either the rod 35 or the rod 32 and the motion of the slot 36 is the result of the motions of 35 and 32. The particular piece 33 of the aggregate motion mechanism I have shown in this application is sometimes called a floating lever and I have so referred to it in some of the claims.

Similarly attention is called to the mechanism bringing the universal portion under the influence of the cams or under the influence of the manual setting. Here also the mechanism is an aggregate movement mechanism. The slotted link as a whole has its position determined by the two links to which it is connected.

For the purpose of the claims it will be convenient to review here the various features of the invention above described. There is the reversing mechanism as applied to one master gear and reversing the operation thereof be it conditioned for addition, nonaction, or subtraction. There is the mechanism determining that a master gear shall be cam governed or manually governed. Moreover when determined as cam governed it is simultaneously governed for addition, nonaction or subtraction. When determined as manually governed it is similarly determined as addition, nonaction or subtraction. This mechanism might be called the governor determinator. There is also the combination mechanism of the governor determinator plus the reverser mechanism, both of which have been alluded to above.

It is evident that should occasion arise therefor, the reversing mechanism could be applied not only to the two master gears and two totalizers but also to a larger number of them simultaneously. Various other changes can readily be made in the construction of the mechanism above described without departing from the principle of my invention.

I claim—

1. In a calculating machine the combination of, a totalizer, a totalizer actuating mechanism, a change gear device determining the action of said actuating mechanism on said totalizer, and a floating lever determining the position of said change gear device.

2. In a calculating machine the combination of, a set of numeral keys, a totalizer, a conditioning part movable into one of three positions, in the first of which it determines that the action of the keys shall produce addition in the totalizer, in another that the action of the keys shall produce subtraction in the totalizer, and in the third that the action of the keys shall have no effect on the totalizer, a handle normally occupying one position and adapted to be manually located in another position, said handle in its second position bringing said conditioning part into the reversing position of the one previously occupied thereby, and means effective to move said conditioning part independently of the position of said handle.

3. In a calculating machine the combination of: 1, a conditioning part locatable in any of three positions in the first of which it conditions the machine to add, in the second of which it conditions the machine to subtract, and in the third of which it conditions the machine to not calculate; 2, a handle manually locatable in any of three positions to thereby locate part 1, in the one of its three corresponding positions; and 3, a reversing handle normally occupying one position and adapted when moved into its other position to reverse the location of part 1.

4. In a calculating machine the combination of, a floating lever locatable in any of three positions, in the first of which it conditions the machine to add, in another to not calculate, and in a third to subtract, a handle connected to one point of said floating lever, and a second handle connected to a second point of said floating lever.

5. In a calculating machine the combination of: 1, a conditioning piece locatable in any of three positions to determine that the machine shall respectively add, subtract or not calculate; 2, an aggregate movement piece determining the position of the conditioning piece 1; 3, a setting handle operative upon the aggregate movement piece; and 4, a reversing handle also operative upon the aggregate movement piece, whereby the machine may be reversed without disturbing the setting of the handle 3.

6. In a calculating machine the combination of: 1, a conditioning piece locatable into any of three positions to thus determine the condition of the machine to add, subtract or to not calculate; 2, a cam mechanism operative upon part 1, to locate it in any of its three said positions, the cam mechanism being shaped to reverse the location of part 1 for a constant movement of said cam; 3, machanism for locating the cam in a determined position; and 4, mechanism for moving said cam through a constant additional distance to thereby reverse the location of part 1.

7. In a calculating machine the combination of: 1, a conditioning part locatable in any of three positions to thus determine the machine to add, not calculate or to subtract; 2, a condition part locating member adapted to be located in any of three normal positions to thereby locate part 1 in corresponding positions, the condition part locating member being also displaceable a constant additional amount whereby it may be brought from any one of its three normal positions to the corresponding one of three special positions, any normal position and not special position of part 2 producing reverse effects upon part 1.

8. In a calculating machine, the combination of: a totalizer; a set of keys; a number inserting mechanism operable by said keys and adapted to insert numbers in said totalizer; a conditioning part to determine the action of said keys on said totalizer; a locating member for said conditioning part; a handle adapted to be set in a plurality of positions connected to said locating member; a second handle operatively connected to said locating member and adapted to displace a part of said locating member a constant amount, thus reversing the action of said keys on said totalizer whereby errors may be corrected.

9. In a calculating machine the combination of: 1, a conditioning part locatable in any of three positions to thereby condition the machine to add, to not calculate or to subtract; 2, floating lever operating upon part 1 to determine its location said floating lever being locatable into any of three normal positions to thereby locate part 1, and also being adapted to be advanced an additional movement to be thus brought into a special location to thereby locate part 1 into different ones of its three positions; 3, a handle for locating the floating lever into any of its three normal positions; and 4, a reversing handle for giving to said floating lever said additional movement to thereby reverse the machine.

10. In a calculating machine the combination of: 1, a conditioning part locatable in any of three positions to condition the machine to add, to not calculate or to subtract; 2, a plate camming part adapted to be brought into three positions; 3, a link forming a pivot for said plate and operating to locate it in any of its three normal positions; and 4, another link also connected to said plate and displacing it about said pivot to thereby locate said plate in a corresponding special position for each of its three normal positions.

11. In a calculating machine the combination of: 1, a conditioning member locatable in any of three positions to condition the machine to add, to not calculate or to subtract; 2, a setting handle adapted to be brought into any of three positions to normally locate member 1 in a proper corresponding position; 3, a reversing handle; and 4, aggregate movement mechanism connecting the above said three parts, 1, 2, and 3.

12. In a calculating machine the combination of: 1, a conditioning mechanism for one totalizer; 2, a conditioning mechanism for another totalizer; and 3, reversing mechanism operating upon both conditioning mechanisms simultaneously.

13. In a calculating machine the combination of: 1, a totalizer; 2, conditioning means for said totalizer to condition it to add, subtract or to not calculate; 3, another totalizer; 4, another conditioning means to condition the second totalizer to add, subtract or to not calculate independently of the conditioning of the first totalizer; and 5, a reversing handle operating on both conditioning means simultaneously for reversing the condition of both totalizers simultaneously.

14. In a calculating machine, the combination of a master mechanism, a handle to condition said master mechanism, (1) to add, (2) to subtract, (3) or not to calculate, a second master mechanism, a handle therefor to condition the second master mechanism (1) to add, (2) to subtract, (3) or not to calculate, a floating lever connected to each of said conditioning handles, and a reversing handle operative on both of said floating levers whereby the condition of both master mechanisms may be simultaneously reversed without disturbing the setting of the two previously recited handles.

15. In a calculating machine, the combination of, a totalizer, conditioning mechanism for conditioning the totalizer to add, subtract, or not to calculate, another conditioning mechanism for simultaneously conditioning the totalizer to add, subtract or not to calculate, and a conditioning governing mechanism to determine which of the two conditioning mechanisms shall temporarily condition the machine.

16. In a calculating machine the combination of: 1, a cam mechanism conditioning the machine to add, subtract or to not calculate; 2, a handle mechanism conditioning the machine to add. subtract or to not calculate; and 3, a conditioning governing mechanism to determine which of the two conditioning mechanisms, the cam or the manual, shall temporarily condition the machine.

17. In a calculating machine the combination of: 1, a conditioning mechanism to condition the machine to add, subtract or to not calculate; 2, further conditioning mechanism to condition the machine to add. subtract or to not calculate; 3, conditioning governing mechanism to determine which of the two conditioning mechanisms shall temporarily condition the machine; and 4, link mechanism connecting the conditioning mechanism 1 and conditioning mechanism 2 and the condition governing mechanism 3.

18. In a calculating machine the combination of: 1, a cam mechanism conditioning the machine to add, subtract or to not calculate; 2, further conditioning mechanism conditioning the machine to add, subtract or to not calculate; 3, condition governing mechanism to determine which of the two conditioning mechanisms shall temporarily condition the machine; and 4, link mechanism connecting the conditioning mechanism 1 and conditioning mechanism 2 and the condition governing mechanism 3.

19. In a calculating machine the combination of: 1, a conditioning mechanism to condition the machine to add; subtract or to not calculate; 2, another conditioning mechanism to condition the machine to add, subtract or to not calculate; 3, a link having one end thereof fulcrumed to a portion of conditioning mechanism 1; 4, another link having one end thereof fulcrumed to a portion of conditioning mechanism 2; 5, a compound link fulcrumed at noncoincident pivots to the free ends of links 3 and 4, and having its location determined partly by; 6, a conditioning governing mechanism; 7, a condition determining part coöperating with the compound link 5; the condition governing mechanism 6 being adapted to locate the compound link 5, in either of two positions in one of which the link 2 becomes effective upon part 7, and link 3 ineffective upon same, and in the other position the link 3 becomes effective upon part 1 and link 2 ineffective upon same.

20. In a calculating machine the combination of: 1, a cam mechanism to condition the machine to add, subtract or to not calculate; 2, another conditioning mechanism to condition the machine to add, subtract or to not calculate; 3, a link having one end thereof fulcrumed to a portion of conditioning mechanism 1; 4, another link having one end thereof fulcrumed to a portion of conditioning mechanism 2; 5, a compound link fulcrumed at noncoincident pivots to the free ends of links 3 and 4, and having its location determined partly by; 6, a conditioning governing mechanism; 7, a condition determining part coöperating with the compound link 5; the condition governing mechanism 6 being adapted to locate the compound link 5, in either of two positions in one of which the link 2 becomes effective upon part 7, and link 3 ineffective upon same, and in the other position the link 3 becomes effective upon part 1 and link 2 ineffective upon same.

21. In a calculating machine the combination of: 1, a totalizer; 2, cam mechanism for conditioning the same to add, subtract or to not calculate; 3, manual settable mechanism for conditioning the totalizer to add, subtract or to not calculate; 4, a conditioning governing device to determine which of the two conditioning devices 2 and 3, shall temporarily condition the totalizer; 5, a reversing mechanism normally occupying one position and placeable to a reversing position to thereby reverse the totalizer; the reversing of the totalizer thus always taking place upon the movement of the reversing mechanism, independently of the position of the first conditioning mechanism and of the second conditioning mechanism and of the conditioning governing mechanism.

22. In a calculating machine the combination of: 1, a totalizer; 2, cam mechanism for determining the condition of the totalizer to add, subtract or to not calculate; 3, a handle for conditioning the totalizer to add, subtract or to not calculate; 4, a conditioning governing handle to determine which of the two conditioning mechanisms, the cam mechanism 2 or the handle 3, shall temporarily condition the machine; 5, a reversing handle normally occupying one position and manually placeable into a reversing position to reverse the condition of the totalizer irrespective of its normal conditioning; and 6, mechanism connecting the above listed parts 1, 2, 3, 4, and 5.

23. In a calculating machine the combination of: 1, a totalizer; 2, cam mechanism for determining the condition of the totalizer to add, subtract or to not calculate; 3, a handle for conditioning the totalizer to add, subtract or to not calculate; 4, a conditioning governing handle to determine which of the two conditioning mechanisms, the cam mechanism 2 or the handle 3, shall temporarily condition the machine; 5, a reversing handle normally occupying one position and manually placeable into a reversing position to reverse the condition of the totalizer irrespective of its normal conditioning; and 6, link mechanism connecting the above listed parts, 1, 2, 3, 4, and 5.

24. In a calculating machine the combination of: 1, a totalizer; 2, cam mechanism for determining the condition of the totalizer to add, subtract or to not calculate; 3, a handle for conditioning the totalizer to add, subtract or to not calculate; 4, a conditioning governing handle to determine which of the two conditioning mechanisms, the cam mechanism 2 or the handle 3, shall temporarily condition the machine; 5, a reversing handle normally occupying one position and manually placeable into a reversing position to reverse the condition of the totalizer irrespective of its normal conditioning; and 6, a cam and link mechanism connecting the above listed parts, 1, 2, 3, 4, and 5.

25. In a calculating machine the combination of, a totalizer, a totalizer actuating mechanism, a change gear device determining the action of said actuating mechanism on said totalizer, a floating lever determining the position of said change gear device, manual means operative on the floating lever, automatic means operative on said floating lever, and an additional manual means also operating on the floating lever to thereby determine its position.

26. In a calculating machine the combination of, a totalizer, a totalizer actuating mechanism, a change gear device determining the action of said actuating mechanism on said totalizer, a floating lever determining the position of said change gear device, a handle operative on the floating lever, automatic means operative on said floating lever, and an additional handle also operating on the floating lever to thereby determine its position.

27. In a calculating machine the combination of, a traveling carriage, a totalizer, a totalizer actuating mechanism, a change gear device determining the action of said actuating mechanism on said totalizer, a floating lever determining the position of said change gear device, a handle operative on the floating lever, automatic means operated by said traveling carriage and operative on said floating lever, and an additional handle also operating on the floating lever to thereby determine its position.

28. In a calculating machine the combination of, a totalizer, a totalizer actuating mechanism, a change gear device determining the action of said actuating mechanism on said totalizer, a floating lever determining the position of said change gear device, a second totalizer, totalizer actuating mechanism, change gear device and floating lever and a manual means operating simultaneously on both the above recited floating levers, whereby the operation of the operating mechanisms on their respective totalizers may be reversed irrespective of the position of the change gear devices.

29. In a calculating machine, the combination of, a totalizer, a totalizer actuating mechanism, a change gear device determining the action of said actuating mechanism on said totalizer, a floating lever determining the position of said change gear device, a handle operative on one point of said floating lever, a cam controlled device operative on said floating lever, a handle whereby it may be determined whether said first recited handle or said cam controlled device operates on said floating lever, and a second handle controlling the position of another point in said floating lever.

30. In a calculating machine the combination of, a change gear device, a floating lever, a second change gear device, a second floating lever, and a bar connecting similar points in said floating levers.

31. In a calculating machine the combination of, a change gear device, a floating lever, a second change gear device, a second floating lever, a bar connecting similar points in said floating levers, and a handle controlling the position of said connecting bar.

In witness whereof, I have hereunto signed my name this 8th day of July 1912.

ARTHUR F. POOLE.

Witnesses:
  JNO. H. NELSON, Jr.,
  T. G. FRANKEL.

Copies of this patent may be obtained for five cents each, by addressing the "Commissioner of Patents, Washington, D. C."